(12) United States Patent
Fan

(10) Patent No.: US 6,519,250 B1
(45) Date of Patent: Feb. 11, 2003

(54) QUICK CONNECT INTERNET TELEPHONE AND METHOD THEREFOR

(75) Inventor: Yuan-Neng Fan, Scottsdale, AZ (US)

(73) Assignee: Fanstel Systems, LLC, Scottsdale, AR (US)

( * ) Notice: Subject to any disclaimer, the term of this patent is extended or adjusted under 35 U.S.C. 154(b) by 0 days.

(21) Appl. No.: 09/293,106

(22) Filed: Apr. 16, 1999

(51) Int. Cl.[7] .............................................. H04L 12/66
(52) U.S. Cl. ....................................................... 370/352
(58) Field of Search ................................. 370/914, 352, 370/356, 480–493, 206, 515, 420, 467–468, 345, 319; 375/222, 148; 379/93.05, 399.01, 414

(56) References Cited

U.S. PATENT DOCUMENTS

| | | | | |
|---|---|---|---|---|
| 5,751,741 A | * | 5/1998 | Voith et al. .................. | 370/914 |
| 6,075,784 A | * | 6/2000 | Frankel et al. ............... | 370/356 |
| 6,084,873 A | * | 7/2000 | Russell et al. ............... | 370/352 |
| 6,141,356 A | * | 10/2000 | Gorman ....................... | 370/493 |
| 6,144,695 A | * | 11/2000 | Helms et al. ................ | 375/222 |
| 6,240,073 B1 | * | 5/2001 | Reichman et al. .......... | 370/319 |

\* cited by examiner

Primary Examiner—Kwang Bin Yao
Assistant Examiner—Prenell Jones
(74) Attorney, Agent, or Firm—Jeffrey D. Moy; Harry M. Weiss; Weiss, Moy & Harris, P.C.

(57) ABSTRACT

An internet telephone system uses a Public Switched Telephone Network (PSTN). An internet network is coupled to the PSTN. At least two telephone stations are part of the system wherein one of the at least two telephone stations is a DSL telephone station which is coupled to the PSTN. The DSL telephone station has a Plain Old Telephone Set (POTS) splitter coupled to the PSTN for directing low frequency signals to a first line and DSL signals to a second line. A DSL line interface is coupled to the POTS splitter for driving and terminating the second line. A DSL transmitter is coupled to the DSL line interface. A DSL receiver is also coupled to the DSL line interface. A Digital Signal Processor (DSP) is coupled to the DSL transmitter and the DSL receiver. A telephone interface is coupled to the first line. An audio transceiver device is coupled to the telephone interface. A CODEC circuit is also coupled to the telephone interface. A ring and hook detect/control circuitry is coupled to the DSP.

50 Claims, 3 Drawing Sheets

BLOCK DIAGRAM OF AN INTERNET TELEPHONE

OPERATION ENVIRONMENT OF INTERNET TELEPHONES

FIG. 2  BLOCK DIAGRAM OF AN INTERNET TELEPHONE

QUICK CONNECT INTERNET TELEPHONE AND METHOD THEREFOR

RELATED APPLICATIONS

This patent application is related to pending U.S. patent application entitled "INTERNET TELEPHONE SYSTEM & METHOD THEREFOR," having a Ser. No. 09/192,761 and a filing data of Nov. 16, 1998, in the name of Yuan-Neng Fan as inventor. The disclosure of the above referenced application is hereby incorporated by reference into this application.

BACKGROUND OF THE INVENTION

1. Field of the Invention

This invention relates to telephony products and methods therefor and, more specifically, to a quick connect internet telephone and method therefor. The quick connect internet telephone allows voice communication to other internet telephones via a DSL connection to an internet network.

2. Description of the Prior Art

Various types of internet telephony systems or methods exist today. These systems or methods generally fall into one of the following categories.

1. PC to PC Call

This system or method uses a personal computer (PC) to establish communications with a second PC. The communication is established using add-on software and hardware to allow the PCs to convey the user's voices via an internet provider (IP) connection. While this system and method does work, it has numerous drawbacks. First, the two parties wishing to communicate must prearrange the date and time for the internet telephone call to take place. Both users must then establish an IP connection, which further requires the users to have previously exchanged correct internet IP address information.

2. PC to Plain Old Telephone Set (POTS) Call

A lessor known or used method is a PC to POTS call method. A user places a modem telephone call to their internet service provider (ISP) with an internet telephone software equipped PC. An internet link is then established to a second ISP, or IT (Internet Telephone) gateway, located proximate to the area to which it is desired to place a phone call. The second ISP/IT gateway is then used to place a phone call using the conventional phone systems to the desired local number. While this method does work, it also has several drawbacks. An IT gateway must be available in the same local calling area as the called party. Otherwise, the user has to pay toll charges from the IT gateway to the called party. Furthermore, the IT gateway typically charges a fee for the time connected which further increases the cost involved with this method. A further problem with this method is that the user has to sign up for IT services with an IT gateway for each geographic area the user desires to place a call. This IT gateway sign up typically includes a monthly subscription fee that must be paid regardless of use or non-use.

3. IT Phone Call to IT Phone Call

Another alternative method is the IT phone call to IT phone call. This method is very similar to the previous method except that regular phones are used at both ends of the call. A user places a regular telephone call to a first local IT gateway with a regular telephone. An internet link is then established from the first IT gateway to a second IT gateway located proximate to the area to which it is desired to place a phone call. The second IT gateway is then used by the user to place a phone call using conventional phone systems to the desired local number. This method also has several drawbacks. An IT gateway must be available at both ends, locally and in the area to which it is desired to call. If an IT gateway is not available at either end, the user may actually have to pay double toll charges, one toll charge at the originating end and another toll charge at the receiving end. Furthermore, each IT gateway typically charges a fee for the time connected. Finally, the user has to sign up for IT gateway services with every IT gateway service provider for each geographic area in which he desires to place calls. This IT sign up typically includes a monthly subscription fee that must be paid regardless of use or non-use. It can be seen that this last method can be both cumbersome and could actually be quite expensive.

SUMMARY OF THE INVENTION

In accordance with one embodiment of the present invention, it is an object of the present invention to provide an improved internet telephone system.

It is another object of the present invention to provide an improved internet telephone system which allows an internet telephone to quickly make a call via an internet network.

It is still another object of the present invention to provide an improved internet telephone system which allows an internet telephone to quickly make a call via an internet network without requiring a dial-up MODEM.

BRIEF DESCRIPTION OF THE PREFERRED EMBODIMENTS

In accordance with one embodiment of the present invention, a quick connect internet telephone station is disclosed. The quick connect internet telephone station has a Plain Old Telephone Set (POTS) splitter coupled to a public switched telephone network (PSTN) for directing low frequency signals to a first line and DSL signals to a second line. A DSL line interface is coupled to the POTS splitter for driving and terminating the second line. A DSL transmitter is coupled to the DSL line interface. A DSL receiver is also coupled to the DSL line interface. A Digital Signal Processor (DSP) is coupled to the DSL transmitter and the DSL receiver. A telephone interface is coupled to the first line. An audio transceiver device is coupled to the telephone interface. A CODEC circuit is also coupled to the telephone interface. A ring and hook detect/control circuitry is coupled to the DSP.

In accordance with another embodiment of the present invention, an internet telephone system is disclosed. The internet telephone system uses a Public Switched Telephone Network (PSTN). An internet network is coupled to the PSTN. At least two telephone stations are part of the system wherein one of the at least two telephone stations is a DSL telephone station which is coupled to the PSTN.

In accordance with another embodiment of the present invention, a method for using a first DSL telephone for a making telephone call is disclosed. The method comprises the steps of: dialing a desired telephone number from the first DSL telephone via a telephone network; determining the type of telephone set at the desired telephone number; routing the telephone call through an internet network when the first DSL telephone recognizes the telephone set of the desired telephone number is one of an internet telephone or a second DSL telephone; and routing the telephone call through the telephone network when the first DSL telephone recognizes the telephone set of the desired telephone number is a POTS telephone.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENT

High-bit-rate Digital Subscriber Loop (HDSL) and Asymmetrical Digital Subscriber Loop (ADSL) was originally developed to replace T1 carrier and video on demand services, respectively. These digital subscriber loops allow a Customer Premise Equipment (CPE) to have a permanent data connection to a Public Switched Telephone Network (PSTN). Thus, a dial-up connection like an analog MODEM is not required.

ADSL has been developed for making Plain Old Telephone Set (POTS) telephone calls and allowing a higher speed data transmission on the same telephone line simultaneously. A POTS telephone call utilizes the lowest frequency band (approximately 0 to 4 kHz). There are currently many proposals for ADSL technologies. The most widely accepted and approved by standards technology committees is called Discrete Multiple Tone (DMT). The frequency band for DMT application is between 25 kHz and 1.1 MHz. In theory, up to an 8 Mbits/sec data string could be transmitted downstream by up to 256 separate 4.3125 KhZ tones in the frequency band of 138 kHz to 1.1 MHz. Up to 800 Kbits/s of data could be transmitted upstream in 32 tones between 25 kHz and 138 kHz.

Figure 1:
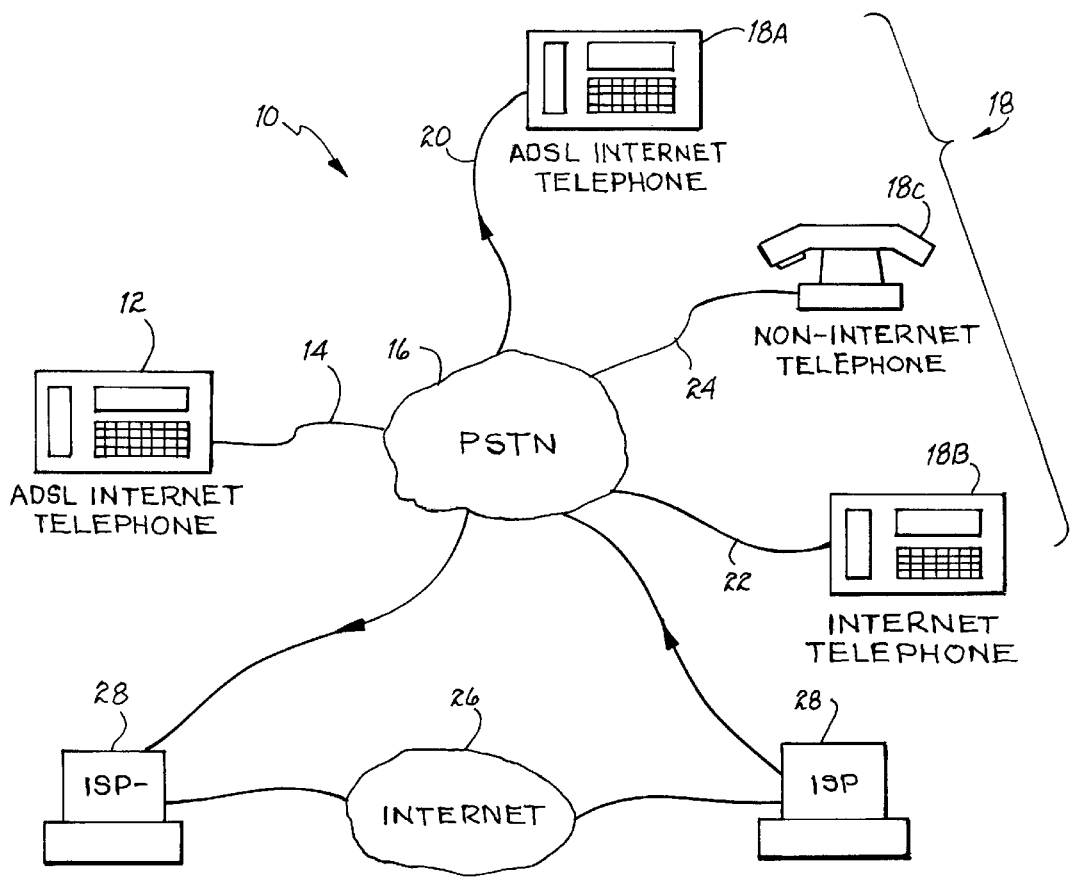
FIG. 1 is a simplified functional block diagram of the internet telephone system of the present invention.

Referring to FIG. 1, a simplified block diagram of the operating environment of the quick connect internet telephone system 10 (hereinafter system 10) of the present invention is shown. The system has at least one ADSL internet telephone 12. The ADSL internet telephone 12 is coupled to a Public Switched Telephone Network (PSTN) 16 via an ADSL line 14. A second telephone 18 is also coupled to the PSTN 16. The second telephone may be a second ADSL telephone 18A, an internet telephone 18B, or a non-internet telephone 18C (i.e. Plain Old Telephone Set (POTS)). If the second telephone 18 is an ADSL telephone 18A, the ADSL telephone 18A would be coupled to the PSTN by an ADSL line 20. If the second telephone 18 is an internet telephone 18B or a non-internet telephone 18C, the second telephone 18 is coupled to the PSTN 16 via lines 22 and 24 respectively.

ADSL technology will allow an ADSL internet telephone 12 to have a continuous on-line data connection to the PSTN 16 and then to an internet network 26 via an Internet Service Provider (ISP) 28. With the present system 10, all toll charges may be avoided when calling a compatible ADSL internet telephone 18A or an internet telephone 18B by establishing a voice communication channel through the internet network 26 via each parties' ISP 28. Furthermore, the call set-up time for the ADSL telephone 12 is usually much shorter than that of a normal DTMF dialing through the PSTN, since a dial-up connection through an analog modem is not required.

The ADSL internet telephone 12 will preferably have a keypad for entering the name, PSTN number, E-Mail/IP address, telephone type, and other information of frequently called, and/or most recently called individuals. This information is generally saved in the memory of the ADSL internet telephone 12.

When making a telephone call, the ADSL internet telephone 12 will detect a hook switch off hook signal. The user of the ADSL internet telephone 12 will then enter a desired PSTN number. The ADSL internet telephone 12 will search for the PSTN number in the data base. If the PSTN number is not found in the data base of the ADSL internet telephone 12, the ADSL internet telephone 12 will send an off-hook signal followed by the PSTN number of the called number in DTMF digits to the PSTN 16. A procedure for information exchange then begins.

When the ADSL internet telephone 12 is calling a compatible ADSL internet telephone 18A or an internet telephone 18B, the call is automatically answered on the first ring by the corresponding telephone of the called party. A direct modem transmission is set up between the calling ADSL internet telephone 12 and the called party's telephone (i.e., compatible ADSL internet telephone 18A or an internet telephone 18B). Information such as each parties' telephone number, name, telephone type, and IP address is exchanged between the ADSL internet telephone 12 and the called party's telephone (i.e., compatible ADSL internet telephone 18A or an internet telephone 18B). This information is then saved in each telephone's data base.

If the called party has a compatible ADSL internet telephone 18A, the ADSL internet telephone 12 sends a START_VOICE_COMMUNICATION protocol and user information to the IP address of the called party via an ADSL link to its ISP 28. The ADSL internet telephone 12 also sends an off-hook signal and number to the PSTN 16. Upon receipt of READY_VOICE_COMMUNICATION protocol from the called party's ADSL internet telephone 18A, the ADSL internet telephone 12 sends an off-hook signal to the telephone company to terminate the PSTN call. A voice communication through the internet network 26 is established via the ADSL lines and each parties ISP 28. If a READY_VOICE_COMMUNICATION is not received by the ADSL internet telephone 12, the ADSL internet telephone 12 waits to establish a POTS telephone call via the PSTN 16.

Upon detection of a hook switch on-hook signal, the calling ADSL telephone 12 will stop sending voice packets. The calling ADSL internet telephone 12 will send an END_VOICE_COMMUNICATION protocol to the IP address of the called ADSL internet telephone 18A. When the ADSL internet telephone 12 receives a REQUEST_END_VOICE protocol from the called party's ADSL internet telephone 18A, or after a period of time without reception of voice packets, the ADSL internet telephone 12 will apply background noise to the speaker informing the user that the called party has ended the telephone conversation.

If the called party has an internet telephone 18B, the ADSL internet telephone 12 will detect only a single ringing tone. The ADSL internet telephone 12 will mute both the voice transmitter and receiver. The ADSL internet telephone 12 will then send its IP address and user information by a direct modem signal to the internet telephone 18B. If a data packet including the called internet telephone's 18B IP address and user information is not received, both voice transmitter and receiver of the ADSL internet telephone 12 are unmuted to establish a POTS telephone call via the PSTN 16. If a data packet including the internet telephone's 18B IP address and user information is received, the ADSL internet telephone 12 saves the information in its data base. This information may further be displayed. The ADSL internet telephone 12 will then go on-hook for a short duration (approximately 2 seconds). The ADSL internet telephone 12 will dial the telephone number of its ISP 28. Upon connection to its ISP 28, the ADSL internet telephone 12 will send a beginning-of-conversation protocol to the IP address of the internet telephone 18B. Upon detection of a hook switch off-hook signal, the ADSL Internet telephone 12 will send packetized voice signals to the IP address of the internet telephone 18B. Upon receipt of packetized data from the called internet telephone 18B, the ADSL internet telephone 12 will convert the voice data into analog signals to establish a voice communication path via the internet network 26. When the ADSL internet telephone 12 detects a hook switch on-hook signal, it stops sending voice packets and sends an end-of-conversation protocol to the IP address of the internet telephone 18B. When the ADSL internet telephone 12 receives an end-of-conversation protocol from the called party's internet telephone 18B, or after a period of time without reception of voice packets, the ADSL internet telephone 12 will apply background noise to the speaker informing the user that the called party has ended the telephone conversation.

If the called party only has a non-internet telephone 18C, the non-internet telephone 18C will not automatically answered the telephone call at the first ring tone as in the previous two examples above (i.e., compatible ADSL internet telephone 18A or an internet telephone 18B). Thus, the ADSL internet telephone 12 will know to process the call as a regular telephone call through the PSTN 16. Even if the called party answers the non-internet telephone 18C after only a single ring tone, the non-internet telephone 18C will not be able to receive the calling party's user information and reply with its own information. Thus, the call will be processed as a regular POTS call via the PSTN 16.

Figure 2:
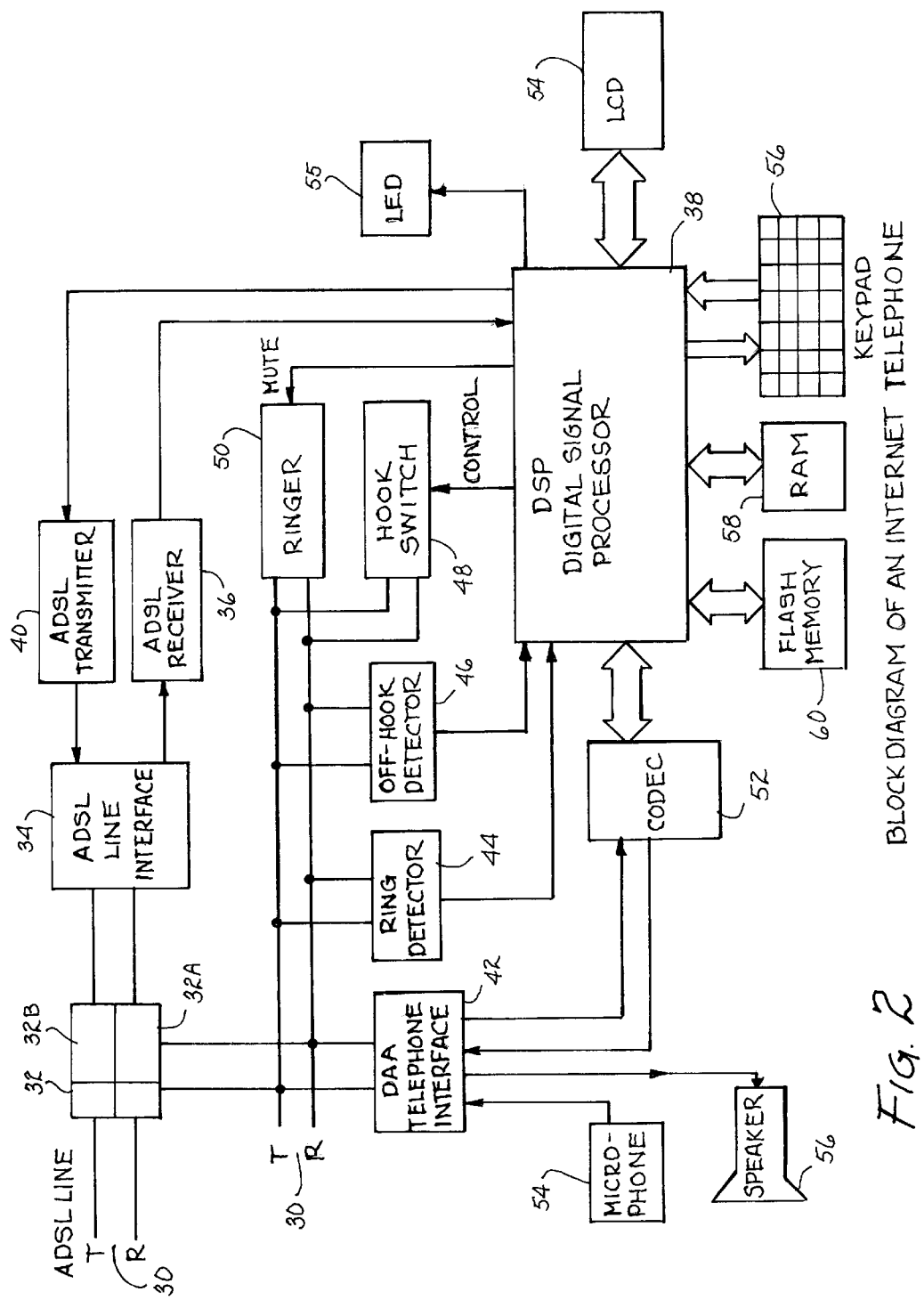
FIG. 2 is a simplified functional block diagram of the quick connect internet telephone station of the present invention.

Referring to FIG. 2, a simplified function block diagram of the ADSL internet telephone 12 and 18A (hereinafter ADSL internet telephone 12) is shown. The ADSL internet telephone 12 is coupled to an ADSL line 30. The ADSL line 30 is a regular external telephone line which has ADSL capabilities. A POTS splitter 32 is coupled to the ADSL line 30. The POTS splitter 32 is generally comprised of both a low pass filter 32A and a high pass filter 32B. The low pass filter 32A is used to provide the pass band for voice frequency signals, dial tone, ringing, and on/off hook signals. The high pass filter 32B is used for the ADSL signals. An ADSL interface 34 is coupled to the POTS splitter 32. The ADSL interface 34 is used to drive and terminate the ADSL line.

An ADSL receiver 36 is coupled to an output of the ADSL line interface 34. The ADSL receiver first converts the analog signal into a digital signal. The digital signal is then passed through a time domain equalizer into serial data. The serial data is converted into multiple channels. Data in each channel is converted into frequency domain signals by a Fast Fourier Transform (FFT) algorithm. The frequency domain signals pass through a frequency domain equalizer, then to a symbol decision, bit decision, and invert parsing functions. The output bit stream from the ADSL receiver 36 is then sent to a Digital Signal Processor (DSP) 38.

An ADSL transmitter 40 is coupled to both the DSP 38 and the ADSL line interface 34. The ADSL transmitter 40 receives bit streams from the DSP 38. The ADSL transmitter 40 will convert the serial bit stream into parallel data. The parallel data is mapped into multibit subchannels according to a bit allocation algorithm. Each multibit subchannel data is converted into time domain signals by Inverse Fast Fourier Transform (IFFT). The parallel time domain signals are then converted into serial signals and then converted into analog signals to be outputted by the ADSL transmitter 40.

The ADSL internet telephone 12 will further comprise a Digital-Analog-Analog (DAA) telephone interface 42, a ring detector 44, an off-hook detector 46, a hook switch 48, and a ringer 50 all of which have input terminals coupled to the ADSL line 30. The DAA telephone interface 42 is used to convert signals from the ADSL line 30 to a four wire interface. The DAA telephone interface 42 is further used to send signals from the DSP 38, which have been converted to analog signals by the CODEC 52, to the ADSL line 30. The ring detector 44 is a circuit which monitors when an incoming telephone call is made to the ADSL internet telephone 12. If an incoming call is placed to the ADSL internet telephone 12, the DSP 38 will energize the ringer 50 to signal that a calling is being placed to the ADSL internet telephone 12. The off-hook detector 46 will monitor when the headset of the ADSL internet telephone 12 is lifted thereby allowing dialing and transmission but prohibiting incoming calls from being answered. The hook switch 48 is a switch that closes a circuit when the headset of the ADSL internet telephone 12 is lifted thereby allowing dialing and transmission but prohibiting incoming calls from being answered.

A (Coder/Decoder) CODEC 52 is coupled to the DAA telephone interface 42. The CODEC 52 receives analog signals from the DAA telephone interface 42. The CODEC 52 will convert the analog signals to digital signals and send the digital signals to the DSP 38 for processing. A microphone 54 and a speaker 56 may also be coupled to the DAA telephone interface 42. The microphone 54 is used to convert sound waves into electronic signals. The speaker 56 will convert electronic impulses to sound waves of sufficient volume to be heard.

A keypad 56 is coupled to the DSP 38. The keypad 58 is used to enter user information of parties who are frequently called. Such information may include, but is not limited to, a party's name, telephone number, telephone type, and ISP/IP address. This information is generally stored in a data base in the ADSL internet telephone 12. The data base is generally a memory module. In the embodiment depicted in FIG. 2, the memory module is comprised of Random Access Memory (RAM) 58 and FLASH memory 60. The FLASH memory 60 is generally used to store firmware programs and information entered by the user via the keypad 56 (i.e., information of parties who are frequently called such as, a party's name, telephone number, telephone type, and ISP/IP address). The RAM 58 is generally used as a scratch pad during program execution.

A display mechanism 54 is also coupled to the DSP 38. In the embodiment depicted in FIG. 2, the display mechanism 54 is a Liquid Crystal Display (LCD) 54. The LCD 54 is used for displaying information that the user entered via the keypad 56 such as the party's name, telephone number, telephone type, and ISP/IP address. The LCD 54 may also function to display information concerning an incoming call. Thus, the LCD 54 may function like a Caller ID unit.

Figure 3:
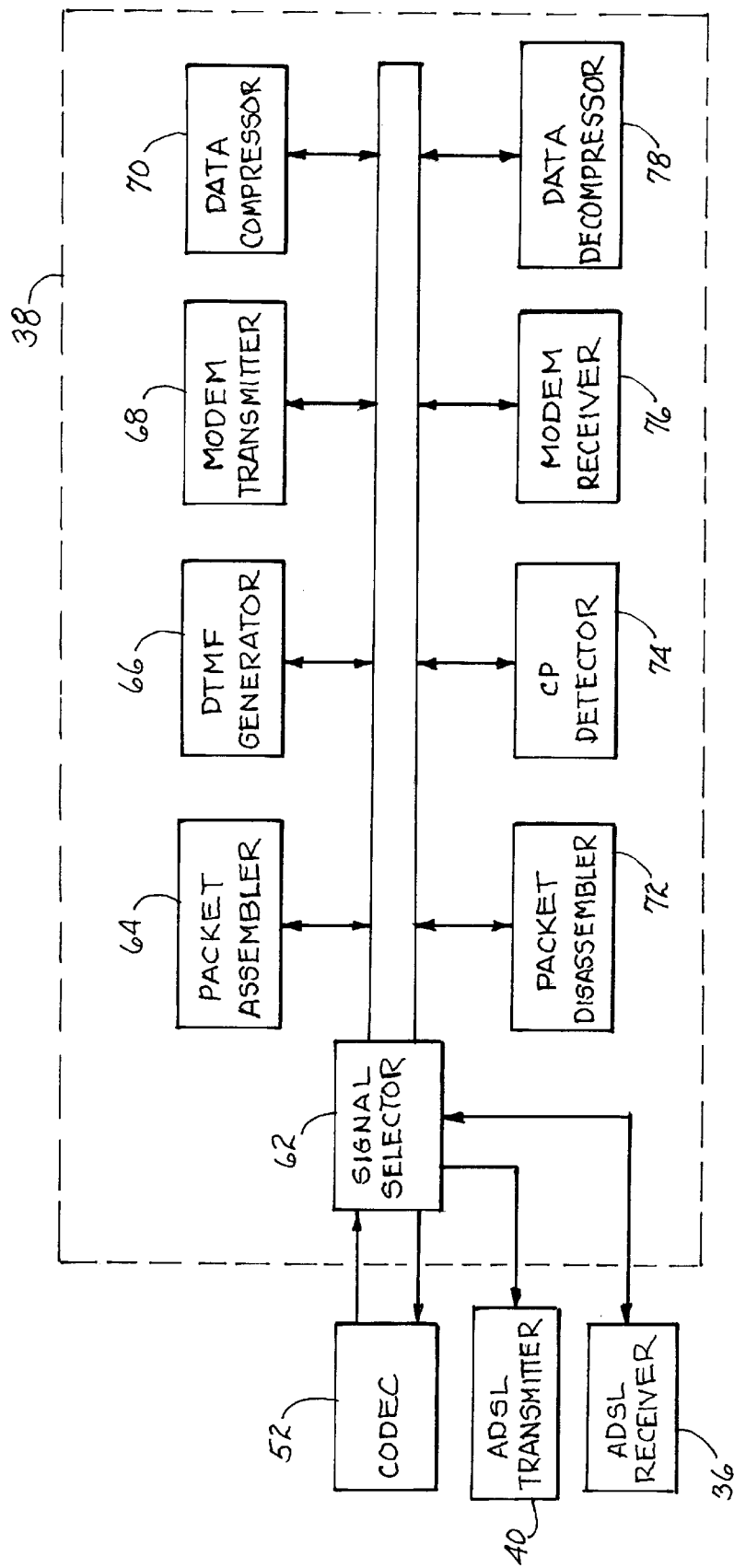
FIG. 3 is a functional block diagram of the firmware module used in the DSP of the quick connect internet telephone station depicted in FIG. 2.

Referring to FIG. 3, a block diagram of the firmware features implemented in the DSP 38 is shown. Hardware components for these features are commercially available. Firmware implementation of these features is used as an example. The firmware features generally include: a signal selector 62, packet assembler 64, DTMF generator 66, MODEM transmitter 68, data compressor 70, packet disassembler 72, Call Progress (CP) detector, MODEM receiver 76, and data decompressor 78. The functions of these firmware features of the DSP 38 will be discussed below.

Referring now to FIGS. 1–3, the operation of the system 10 will be discussed. It should be noted that the internet telephone 18B is similar in design to that of the ADSL internet telephones 12 and 18A shown in FIGS. 2 and 3 except that the specific ADSL function blocks are not included. Thus, the operation of the internet telephone 18B will be described in reference to FIGS. 2 and 3.

The ADSL internet telephone 12 dials a telephone number by sending Dual Tone Multiple Frequencies (DTMF) to the PSTN 16. It should be noted that DTMF dialing is a traditional hardware function. It is implemented in this embodiment of the ADSL internet telephone 12 as a firmware function. The DTMF generator 66, a firmware function of the DSP 38, sends DTMF signals to the signal selector 62. This signal is converted into an analog signal by the CODEC 23 and sent to the ADSL line 30 through the DAA telephone interface 42. A telephone company will make a connection to the dialed number via the PSTN 16 and will send a ringing signal to the dialed number.

If the called number is a non-internet telephone 18C, the non-internet telephone 18C will ring continuously till an end user answers the call. If the called number is a compatible internet telephone 18A or an internet telephone 18B (hereinafter called telephone 18A), the ringing detector 44 detects incoming ringing signals and informs the DSP 38 of the incoming ringing signals. Upon receipt of a first ringing signal, the DSP 38 disables the ringer 50 to stop the called party from lifting the headset of the called telephone 18A. The DSP 38 activates the electronic hook switch 48 to close the loop and answer the incoming telephone call.

At the calling ADSL internet telephone 12, incoming signals on the ADSL line 30 are converted to a four wire interface by the DAA telephone interface 42. The incoming signals are digitized by the CODEC 52 and sent to the CP detector 74, a firmware module within the DSP 38.

As stated above, if more than one ringing tone is detected, the called party is a non-internet telephone 18C. Ringing will continue till the non-internet telephone 18C is answered by the called party or the calling party discontinues the telephone call. The call will be routed through the PSTN 16. No attempt is made to reroute the call through the internet network 26.

If the calling ADSL internet telephone 12 detects only a single ringing tone, this call is answered by the called telephone 18A. An exchange of user information will begin. The DSP 38 will send a signal causing the LED 55 to begin to flash indicating that an exchange of user information has begun.

The ADSL internet telephone 12 will transfer its user information in the following manner. The DSP 38 will retrieve the user information (i.e., name, telephone number, telephone type, and ISP/IP address) of the ADSL internet telephone 12 from the FLASH memory 29. The packet assembler 64 assembles the information into data packets which is converted into a MODEM signal in a digitized format by the MODEM transmitter 68. The digitized MODEM signal is sent to the CODEC 52 through the signal selector 62. The CODEC 52 converts the digitized MODEM signal into an analog signal. The analog signal is sent to the ADSL line 30 through the DAA telephone interface 42 to the called telephone 18A. The called telephone 18A receives the MODEM signal in its analog form at its DAA telephone interface 42. The analog signal is converted to a digital signal by the CODEC 52 and is sent to the MODEM receiver 76 via the signal selector 62. The DSP 38 disassembles the data packet from the MODEM receiver 76, displays the calling party's telephone number and name on the LCD 54. The DSP 38 will also store the calling party's information in its FLASH memory 60.

The DSP 38 of both the calling ADSL internet telephone 12 and the called telephone 18A deactivate their respective electronic hook switch 48 to go on-hook. After approximately two seconds of delay, each DSP 38 activates its respective electronic hook switch 48 to go to an off-hook state.

The DTMF generator 66 of the calling ADSL internet telephone 12 sends the telephone number of its ISP 28 through the signal selector 62. The digital signal is converted into an analog signal by the CODEC 52. The DTMF signal in analog format is sent to the ADSL line 30 via the DAA telephone interface 42. Upon receipt of the DTMF signal, the PSTN 16 connects this call to the ISP 28. When the CP detector 74 detects the end of a ringing tone, it informs the MODEM transmitter 68 to begin transmission of a MODEM signal training sequence at a speed of 14.4 kbps. After the connection of 14.4 kbps modem to the ISP 28, the CODEC 52 begins to receive voice signals through the microphone 54 via the DAA telephone interface 42. The CODEC digitizes the voice signal at 8 k bytes per second or 64 kbps. The digitized voice signal is sent to the data compressor 70 where the voice signal is compressed using the GSM algorithm to 13 kbps or the ITU G 723.1 algorithm to about 6 kbps. The data packet assembler 64 assembles the compressed data with the IP address of the called telephone 18A. The data packet is sent to the MODEM transmitter 68, to the signal selector 62, to the CODEC 52, through the DAA telephone interface 42, then to the ADSL line 30.

At the same time, the called telephone 18A calls its ISP 28 and begins transmission of packetized voice signals with the IP address of the calling ADSL internet telephone 12. A voice transmission path is now established via the internet network 26.

The ADSL internet telephone 12 receives the MODEM signal from the ADSL line 30. The MODEM signal is sent through the DAA telephone interface 42, to the CODEC 52, to the MODEM receiver 76 where the signal is converted to data packets. The data packets are sent to the data decompressor 78 where the IP address and other overhead bytes are removed to obtain the compressed data. The compressed data is converted into 64 kbps data. This data is converted into an analog signal which is sent to the speaker 56 via the CODEC 52 and the DAA telephone interface 42. A voice reception path is now established through the internet network 26. Thus, instead of making a call through the PSTN 16 and paying toll charges, the call is routed through the internet network 26. Toll charges can now be saved.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A quick connect internet telephone station comprising, in combination:
   a Plain Old Telephone Set (POTS) splitter coupled to a public switched telephone network (PSTN) for directing low frequency signals to a first line and DSL signals to a second line;

a DSL line interface coupled to said POTS splitter for driving and terminating said second line;

a DSL transmitter coupled to said DSL line interface;

a DSL receiver coupled to said DSL line interface;

a Digital Signal Processor (DSP) coupled to said DSL transmitter and said DSL receiver;

a telephone interface coupled to said first line;

an audio transceiver device coupled to said telephone interface;

a CODEC circuit coupled to said telephone interface; and ring and hook detect/control circuitry coupled to said DSP.

2. A quick connect internet telephone station in accordance with claim 1 wherein said POTS splitter comprises:

a low pass filter coupled to said PSTN for directing said low frequency signals to said first line; and a high pass filter coupled to said PSTN for directing said DSL signals to said second line.

3. A quick connect internet telephone station in accordance with claim 2 wherein said low pass filter provides a band pass for voice frequency signals, dial tone signals, ringing signals, and on/off hook signals.

4. A quick connect internet telephone station in accordance with claim 2 wherein said high pass filter is used for directing ADSL signals to said second line.

5. A quick connect internet telephone station in accordance with claim 1 wherein said DSL transmitter is for receiving a data from said DSP and converting said data into analog signals for transmission.

6. A quick connect internet telephone station in accordance with claim 5 wherein said DSL transmitter is further used for mapping said data from said DSP into multibit subchannels, converting said multibit subchannels into time domain signals, converting said time domain signals into serial signals, and converting said serial signals into said analog signals for transmission.

7. A quick connect internet telephone station in accordance with claim 1 wherein said DSL receiver is used for converting said DSL signal to an output bit stream and for sending said output bit stream to said DSP.

8. A quick connect internet telephone station in accordance with claim 7 wherein said DSL receiver is further used for converting said DSL signal into multiple channels; converting each of said multiple channels into frequency domain signals; and running each of said multiple channels through symbol decision functions, bit decision functions, and invert bit parsing functions for sending said output bit stream to said DSP.

9. A quick connect internet telephone station in accordance with claim 1 wherein said DSP comprises:

a signal selector coupled to said DSL transmitter, said DSL receiver, and to said CODEC;

a packet assembler-dissassember coupled to said signal selector;

a Dual Tone Multi-Frequency (DTMF) generator coupled to said signal generator;

a Call Progress (CP) detector coupled to said signal generator;

a MODEM transmitter-receiver coupled to said signal selector; and a data compressor-decompressor coupled to said signal selector.

10. A quick connect internet telephone station in accordance with claim 1 wherein said audio transceiver comprises:

a speaker coupled to said telephone interface; and a microphone coupled to said telephone interface.

11. A quick connect internet telephone station in accordance with claim 1 wherein said ring and hook detect circuitry comprises:

a ring detector coupled to said DSP; and an off-hook detector coupled to said DSP.

12. A quick connect internet telephone station in accordance with claim 11 wherein said ring and hook detect circuitry further comprises:

a ringer coupled to said DSP; and a hook switch coupled to said DSP.

13. A quick connect internet telephone station in accordance with claim 1 further comprising memory coupled to said DSP.

14. A quick connect internet telephone station in accordance with claim 13 wherein said memory comprises:

flash memory coupled to said DSP; and

Random Access Memory (RAM) coupled to said DSP.

15. A quick connect internet telephone station in accordance with claim 1 further comprising a keypad.

16. A quick connect internet telephone station in accordance with claim 1 further comprising a visual display mechanism.

17. A quick connect internet telephone station in accordance with claim 16 wherein said visual display mechanism is an LCD display.

18. A quick connect internet telephone station in accordance with claim 16 wherein said visual display mechanism is an LED display.

19. An internet telephone system comprising, in combination:

a Public Switched Telephone Network (PSTN);

an internet network coupled to said PSTN; and at least two telephone stations wherein at one of said at least two telephone stations is a DSL telephone station coupled to said PSTN wherein said at least one DSL telephone comprises:

a Plain Old Telephone Set (POTS) splitter coupled to said PSTN for directing low frequency signals to a first line and DSL signals to a second line;

a DSL line interface coupled to said POTS splitter for driving and terminating said second line;

a DSL transmitter coupled to said DSL line interface;

a DSL receiver coupled to said DSL line interface;

a DSP coupled to said DSL transmitter and said DSL receiver;

a telephone interface coupled to said first line;

an audio transceiver device coupled to said telephone interface;

a CODEC circuit coupled to said telephone interface; and ring and hook detect/control circuitry coupled to said DSP.

20. A quick connect internet telephone station in accordance with claim 19 wherein said POTS splitter comprises:

a low pass filter coupled to said PSTN for directing said low frequency signals to said first line; and a high pass filter coupled to said PSTN for directing said DSL signals to said second line.

21. A quick connect internet telephone station in accordance with claim 20 wherein said low pass filter provides a band pass for voice frequency signals, dial tone signals, ringing signals, and on/off hook signals.

22. A quick connect internet telephone station in accordance with claim 20 wherein said high pass filter is used for directing ADSL signals to said second line.

23. A quick connect internet telephone station in accordance with claim 19 wherein said DSL transmitter is for receiving a data from said DSP and converting said data into analog signals for transmission.

24. A quick connect internet telephone station in accordance with claim 23 wherein said DSL transmitter is further used for mapping said data from said DSP into multibit subchannels, converting said multibit subchannels into time domain signals, converting said time domain signals into serial signals, and converting said serial signals into said analog signals for transmission.

25. A quick connect internet telephone station in accordance with claim 19 wherein said DSL receiver is used for converting said DSL signal to an output bit stream and for sending said output bit stream to said DSP.

26. A quick connect internet telephone station in accordance with claim 25 wherein said DSL receiver is further used for converting said DSL signal into multiple channels; converting each of said multiple channels into frequency domain signals; and running each of said multiple channels through symbol decision functions, bit decision functions, and invert bit parsing functions for sending said output bit stream to said DSP.

27. A quick connect internet telephone station in accordance with claim 19 wherein said DSP comprises:
   a signal selector coupled to said DSL transmitter, said DSL receiver, and to said CODEC;
   a packet assembler-dissassember coupled to said signal selector;
   a Dual Tone Multi-Frequency (DTMF) generator coupled to said signal generator;
   a Call Progress (CP) detector coupled to said signal generator;
   a MODEM transmitter-receiver coupled to said signal selector; and
   a data compressor-decompressor coupled to said signal selector.

28. A quick connect internet telephone station in accordance with claim 19 wherein said ring and hook detect circuitry comprises:
   a ring detector coupled to said DSP;
   an off-hook detector coupled to said DSP;
   a ringer coupled to said DSP; and
   a hook switch coupled to said DSP.

29. A quick connect internet telephone station in accordance with claim 19 further comprising memory coupled to said DSP.

30. A quick connect internet telephone station in accordance with claim 19 further comprising a keypad.

31. A quick connect internet telephone station in accordance with claim 19 further comprising a visual display mechanism.

32. A quick connect internet telephone station in accordance with claim 31 wherein said visual display mechanism is an LCD display.

33. A quick connect internet telephone station in accordance with claim 31 wherein said visual display mechanism is an LED display.

34. A method for using a first DSL telephone for a making telephone call comprising the steps of:
   dialing a desired telephone number from said first DSL telephone via a telephone network;
   determining type of telephone set at said desired telephone number;
   routing said telephone call through an internet network when said first DSL telephone recognizes said telephone set of said desired telephone number is one of an internet telephone or a second DSL telephone; and
   routing said call through said telephone network when said first DSL telephone recognizes said telephone set of said desired telephone number is a POTS telephone.

35. The method of claim 34 wherein said step of dialing a desired telephone number from a first DSL telephone via a telephone network further comprises the steps of:
   detecting a hook switch off-hook signal by said first DSL telephone;
   entering said desired telephone number into said first DSL telephone;
   sending an off-hook signal by said first DSL telephone; and
   sending said desired telephone number to said telephone network.

36. The method of claim 35 further comprising the step of searching a data base of said first DSL telephone for said desired telephone number.

37. The method of claim 34 wherein said step of determining type of telephone set at said desired telephone number comprises the steps of:
   detecting of a ringing tone of a telephone set of said desired telephone number by said first DSL telephone;
   recognizing said telephone set of said desired telephone number is one of an internet telephone or a second DSL telephone if only a single ringing tone is detected; and
   recognizing said telephone set of said desired telephone number is a POTS telephone if more than a single ringing tone is detected.

38. The method of claim 37 wherein said step of recognizing said telephone set of said desired telephone number is one of an internet telephone or a second DSL telephone if only a single ringing tone is detected further comprises the steps of:
   automatically answering of said telephone set of said desired telephone number after only a single ringing tone; and
   identifying said telephone set of said desired telephone number is a second DSL telephone by said first DSL telephone.

39. The method of claim 38 further comprising the steps of:
   establishing a direct modem transmission; and
   transferring of identification information of said first DSL telephone and said second DSL telephone.

40. The method of claim 39 wherein said step of transferring of identification information further comprises the step of transferring name of both parties, telephone number of both parties, Internet Provider (IP) address of both parties, and telephone type of both parties.

41. The method of claim 40 wherein said step of routing said call through an internet network further comprises the steps of:
   sending START_VOICE_SIGNAL and said identification information from said first DSL telephone to IP address of said second DSL telephone via DSL link to said internet network;
   sending READY_VOICE_SIGNAL from said second DSL telephone;
   establishing voice communication through said internet network via DSL lines; and
   terminating said telephone call on completion of said telephone call.

42. The method of claim 41 wherein said step of terminating said telephone call further comprises the steps of:
   detection of hook switch on-hook signal;
   termination of sending of voice packets; and
   sending of END_VOICE_SIGNAL to IP address of said second DSL telephone.

43. The method of claim 37 wherein said step of recognizing said telephone set of said desired telephone number is one of an internet telephone or a second DSL telephone if only a single ringing tone is detected further comprises the steps of:
   automatically answering of said telephone set of said desired telephone number after only a single ringing tone; and
   identifying said telephone set of said desired telephone number is an internet telephone by said first DSL telephone.

44. The method of claim 43 further comprising the steps of:
   establishing a direct modem transmission; and
   transferring of identification information of said first DSL telephone and to said internet telephone.

45. The method of claim 44 wherein said step of transferring of identification information further comprises the step of transferring name of both party, telephone number of party, Internet Provider (IP) address of party, and telephone type of party.

46. The method of claim 44 wherein said step of routing said call through an internet network further comprises the steps of:
   dialing of IP telephone number by said internet telephone;
   sending beginning-of-conversation signal to IP address of said DSL telephone;
   establishing voice communication path; and
   terminating said telephone call on completion of said telephone call.

47. The method of claim 46 wherein said step of establishing voice communication path further comprises the steps of:
   detection of a hook switch off-hook signal;
   sending packetized voice signal; and
   converting of voice data into analog signals to establish voice communication path.

48. An internet telephone system in accordance with claim 19 wherein said at least two telephone stations further comprises at least two telephone stations further comprises a second DSL telephone station coupled to said PSTN.

49. An internet telephone system in accordance with claim 19 wherein said at least two telephone stations further comprises an internet telephone coupled to said PSTN.

50. An internet telephone system in accordance with claim 19 wherein said at least two telephone stations further comprises a Plain Old Telephone Set (POTS).

* * * * *